Jan. 31, 1939.  F. J. DULTMEIER  2,145,236
STEERING STABILIZER FOR TRACTORS
Filed Feb. 23, 1937
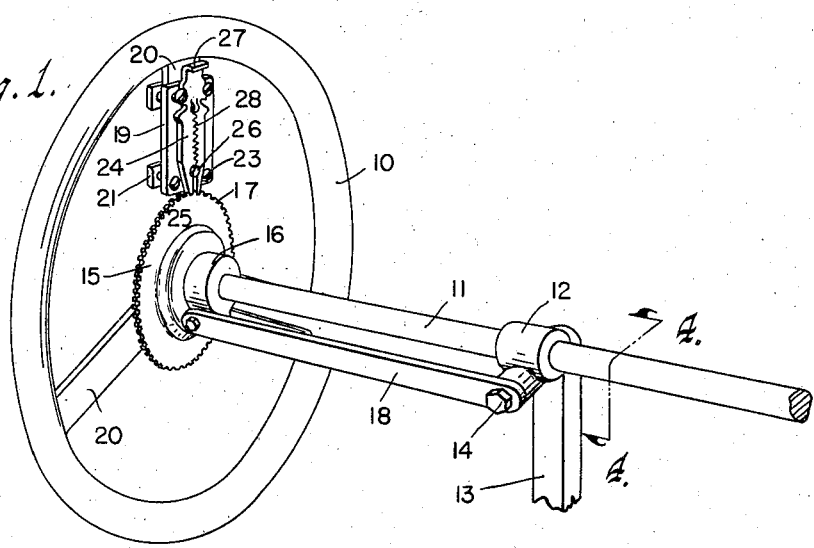
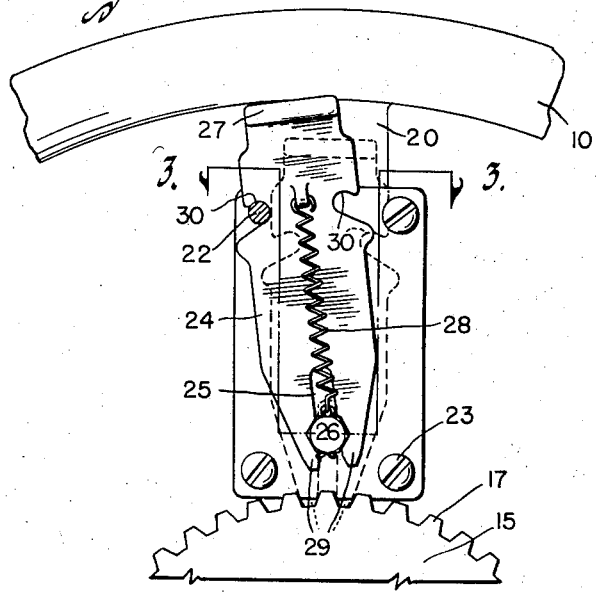
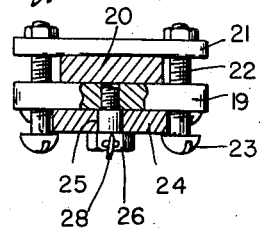
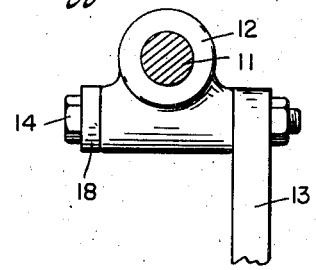
Inventor
Frank J. Dultmeier
by Bair, Freeman & Sinclair
Attorneys
Witness Patented Jan. 31, 1939

2,145,236

UNITED STATES PATENT OFFICE 2,145,236

STEERING STABILIZER FOR TRACTORS

Frank J. Dultmeier, Casey, Iowa

Application February 23, 1937, Serial No. 127,157

5 Claims. (Cl. 74—495)

The operator of a tractor is subjected to continuous strain and effort, because in the running of the standard tractor, he must keep one or both hands on the steering wheel all of the time and must continually hold the steering wheel in proper position to keep the tractor from drifting or traveling out of the desired path.

It is my purpose to provide a steering stabilizer whereby the tractor operator can be relieved of a substantial part of that strain and effort.

For accomplishing this purpose, it is my object to provide a simple and inexpensive mechanism which can be mounted on the tractor, either as an attachment or during the original manufacture as an original fixture.

It is my purpose to provide a device of the kind under consideration whereby when the operator has set the course of the tractor, the steering mechanism may be held against change until the operator desires to make a change.

Particularly, it is my purpose to provide such an apparatus having a part or parts readily accessible to the hand of the operator on the steering wheel, so that the operator can with the same hand manipulate the steering wheel and control my stabilizer. Thus by the manipulation of a conveniently accessible element, the stabilizer can be made operative or inoperative at the option of the operator.
With these and other objects in view, my invention consists in the construction, arrangement and combination of the various parts of my steering stabilizer for tractors, whereby the objects contemplated are attained, as hereinafter more fully set forth, pointed out in my claims, and illustrated in the accompanying drawing, in which:

Figure 1 shows a perspective view of the steering wheel and steering rod of a tractor equipped with a steering stabilizer embodying my invention.

Figure 2 is an enlarged front view of part of the stabilizer, one of the bolts being shown in section.

Figure 3 is a detail, sectional view taken on the line 3—3 of Figure 2; and

Figure 4 is a detail, sectional view taken on the line 4—4 of Figure 1.

I have illustrated in my drawing a form in which my invention may be conveniently embodied for use with a "John Deere" row crop tractor, although I do not want to be limited to the particular details by which my device is connected with the tractor parts, and I desire to make clear that by very slight modifications, which I consider within the scope of my invention, my steering stabilizer can be adapted for use with other tractors.

In the drawing, I have shown the steering wheel 10 fixed to the steering rod 11, journaled in a bearing 12 at the upper end of a supporting post 13.

In the particular form here shown, the bearing 12 is connected to the post 13 by a bolt 14.

In this particular form of device, the bolt 14 is a little longer than the bolt ordinarily used in order to allow for the attachment of a part of my stabilizer, but otherwise the parts heretofore described are the standard parts of the "John Deere" tractor.

My steering stabilizer in the form illustrated includes a disc 15 having a hub 16, which receives the rod 11 near the steering wheel 10. The disc 15 has extending around its periphery a series of notches 17. A bar 18 is secured to the hub 16 and projects forwardly and is mounted on the bolt 14.

Thus the disc 15 is rigidly fixed to a stationary part of the tractor.

For providing the movable member on the wheel, which is accessible to the hand of the operator and which cooperates with the disc, I have shown a plate 19 fastened to a wheel spoke 20 by cross bars 21 and bolts 22.

Projecting from the forward face of the plate 19 are laterally spaced projecting members 23, which in the present instance happen to be the heads of the upper bolts 22.

In the present form of my invention, the latch bar 24 is slidably and rockably mounted on the plate 19.
The latch bar 24 has an elongated slot 25 projecting upwardly from its lower end and receiving the shank of the headed bolt 26.

At its upper end, the latch bar 24 has the right-angled flange 27 extending forwardly and forming a means peculiarly convenient of access to the hand of the operator on the rim of the wheel 10.

A contractible coil spring 28 secured to bar 24 below the flange 27 and to the headed bolt 26 tends to yieldingly pull the latch bar 24 toward its lower limit of movement, where its end parts 29 on the opposite sides of the slot 25, will fit into notches 17 of the disc 15 and rigidly connect the wheel 10 and steering rod 11 with a fixed part of the tractor, so that the wheel and rod will thus be held until some change is made.

The latch bar 24 has the laterally spaced opposite shoulders 30, so located that the operator can with his fingers engaging the flange 27 pull the bar 24 lengthwise away from the disc 15 and then swing the outer end of the bar 24 to the right or left for causing one of the shoulders 30 to engage over one of the projecting members 23, for thus holding the bar in its outer and inoperative position.

It will be understood that the bar 24 has been described as though it were on the upper part of the steering wheel 10, but, of course, it may be anywhere on a radial projection from the axis of the disc 15.

In the practical operation of my steering stabilizer, the bar 24 may be left in the position for instance shown in Figure 2, with one of the shoulders 30 engaged on one of the projecting members 23 for thereby holding the bar 24 in inoperative position against the tension of the spring 28, which spring tends to hold the bar in place frictionally and thus to hold it against accidental release.

Let us assume then that the operator is driving the tractor across the field and that he wants to set it so that it will continue to follow a given course. The steering wheel 10 has been adjusted, and then the operator can with his fingers manipulate the flange 27 for moving the latch bar 24 away from the member 23 to position located between the respective members 23, where the spring 28 will tend to slide the bar 24 lengthwise to position for engaging the notches 17 of the disc 15.

The operator permits the spring to move the bar 24 to such engaging position, whereupon the steering mechanism will be held without change until the operator releases the bar 24.

The tractor will then travel ahead in the desired path without the strain and effort on the part of the driver, which is ordinarily incident to the operation of the tractor.

The operator may for a few moments have both hands free for the manipulation of other controls or for any purpose desired.

The importance of the possibility of thus fixing the steering mechanism so that the tractor can be driven in a desired path may be illustrated by calling attention to the fact that the operator may be driving the tractor on a side hill where it constantly tends to drift. The drift can ordinarily be avoided only by constant effort to hold the steering wheel in proper place, so that the front wheels may be kept traveling against the grade.

With my stabilizer, steering mechanism can be set and the rather severe strain incident to holding the steering wheel in proper position can be largely eliminated.

With a stabilizer of this kind, the labor and fatigue due to the operation of a tractor can be very greatly reduced. At the same time, the operator has practically instantaneous control of the stabilizer. If he is operating the steering wheel with one hand, he can still manipulate the stabilizer with one or two fingers of the same hand.

It will be observed that while I have here illustrated one form in which my stabilizer may be built and used, yet by very slight modifications, it can be adapted for use with other tractors and can be modified as to the shape, number and arrangement of parts, and the manner in which they are mounted on the tractor.

It is essential that there should be a part fixed to the tractor and a part on the steering wheel readily accessible to the hand of the operator, who is manipulating the steering wheel, and adjustable for cooperation with the fixed part mentioned.

The particular structure and mode of mounting of these parts may be varied within a wide range. For example, instead of the toothed disc 15 and the sliding rocking latch bar 24, a great variety of equivalents might be used. For instance, various kinds of frictional devices might be used, devices using pins and holes might be employed and various forms of ratchets could be used.

I intend to cover by my claims any modification in size, shape or arrangement of parts, which may be included within the real scope of my invention and of these claims.

I claim:

1. In combination with a tractor having a steering wheel, a fixed peripherally notched disc concentric with and adjacent the wheel, a retainer device on the wheel, a latch bar on the wheel slidable into and out of engagement with the respective notches of the disc, and rockable when out of such engagement, to engage the retainer device, whereby the member is held against movement toward the disc.

2. In combination with a tractor having a steering wheel, a peripherally notched disc concentric with and adjacent the wheel, means for rigidly connecting the disc with a fixed part of the tractor, a latch bar on the wheel accessible to the hand of an operator placed on the wheel for steering purposes, a retainer device on the wheel, said latch bar having limited movement whereby it can be moved into cooperating engagement with the toothed disc for holding the steering wheel against rotation, or into cooperative relation with the retainer device, and free from the disc.

3. In combination with a tractor having a steering wheel and steering post, a peripherally toothed wheel on the post concentric with and adjacent the wheel, a bar fixed to the disc and to a fixed part of the tractor to hold the disc against movement on the post, a latch bar on the wheel, a retainer device on the wheel, said latch bar having limited sliding movement, whereby it may be slid into and out of latching relation to the disc and rocked into and out of cooperating engagement with the retainer device.

4. In a steering stabilizer for tractors and the like, a member adapted to be mounted adjacent a steering wheel, a coacting device adapted to be mounted on the steering wheel, for movement to and from locking engagement with the member and a bar connected with said member and adapted to be extended along a steering rod, away from the steering wheel and to be secured to a fixed part of the tractor or the like for holding the member against motion.

5. In a steering stabilizer for tractors or the like, adapted for use with a steering rod and a steering wheel, a rim with a notched annular member adapted to be fixed adjacent to and concentric with such a wheel, a latching member adapted to be supported on the wheel for movement into and out of engagement with the notches of the annular member, said latching member having a portion adapted to be spaced inwardly from the rim of the steering wheel and inclined away from the wheel to be conveniently engaged by the fingers of a hand grasping the wheel.

FRANK J. DULTMEIER.